US 12,127,137 B2

(12) United States Patent
Navarro et al.

(10) Patent No.: US 12,127,137 B2
(45) Date of Patent: Oct. 22, 2024

(54) METHOD AND SYSTEM FOR WIRELESS POWER DELIVERY

(71) Applicant: Reach Power, Inc., Redwood City, CA (US)

(72) Inventors: Gustavo Navarro, Redwood City, CA (US); Varun Ramaswamy, Redwood City, CA (US); Christopher Joseph Davlantes, Redwood City, CA (US)

(73) Assignee: Reach Power, Inc., Redwood City, CA (US)

( * ) Notice: Subject to any disclaimer, the term of this patent is extended or adjusted under 35 U.S.C. 154(b) by 0 days.

(21) Appl. No.: 18/217,872

(22) Filed: Jul. 3, 2023

(65) Prior Publication Data
US 2023/0362837 A1 Nov. 9, 2023

Related U.S. Application Data

(63) Continuation of application No. 17/500,652, filed on Oct. 13, 2021, now Pat. No. 11,743,841, which is a
(Continued)

(51) Int. Cl.
*H04W 52/28* (2009.01)
*H04W 52/06* (2009.01)
(Continued)

(52) U.S. Cl.
CPC ......... *H04W 52/367* (2013.01); *H04W 52/06* (2013.01); *H04W 52/223* (2013.01);
(Continued)

(58) Field of Classification Search
CPC . H04W 52/367; H04W 52/06; H04W 52/223; H04W 52/283; H04W 52/34; H04W 52/50
See application file for complete search history.

(56) References Cited

U.S. PATENT DOCUMENTS 6,967,462 B1 11/2005 Landis
7,144,922 B2 12/2006 Demssie et al.
(Continued)

FOREIGN PATENT DOCUMENTS

CN 1568587 A 1/2005
CN 103026764 A 4/2013
(Continued)

OTHER PUBLICATIONS

Wikipedia contributors. "Power dividers and directional couplers", Wikipedia, The Free Encyclopedia. Wikipedia, The Free Encyclopedia, Mar. 1, 2020. Web. Jun. 5, 2020. (Year: 2020).
(Continued)

*Primary Examiner* — Dominic E Rego
(74) *Attorney, Agent, or Firm* — Jeffrey Schox; Samuel Rosenthal

(57) ABSTRACT

A method for wireless power delivery, preferably including: determining transmitter-receiver proximity, assessing transmission parameters, and/or transmitting power based on a transmission plan. A system for wireless power delivery, preferably including a plurality of receivers and one or more transmitters.

20 Claims, 5 Drawing Sheets

Related U.S. Application Data continuation of application No. 17/006,242, filed on Aug. 28, 2020, now Pat. No. 11,178,625, which is a continuation-in-part of application No. 16/706,131, filed on Dec. 6, 2019, now Pat. No. 10,798,665, which is a continuation-in-part of application No. 16/698,196, filed on Nov. 27, 2019, now Pat. No. 10,778,044, and a continuation-in-part of application No. 16/539,288, filed on Aug. 13, 2019, now Pat. No. 11,183,886, and a continuation-in-part of application No. 16/415,664, filed on May 17, 2019, now Pat. No. 10,548,099, said application No. 16/539,288 is a continuation of application No. 16/295,684, filed on Mar. 7, 2019, now Pat. No. 10,424,973, said application No. 16/415,664 is a continuation of application No. 16/001,725, filed on Jun. 6, 2018, now Pat. No. 10,341,967.

(60) Provisional application No. 62/888,817, filed on Aug. 19, 2019, provisional application No. 62/817,063, filed on Mar. 12, 2019, provisional application No. 62/773,935, filed on Nov. 30, 2018, provisional application No. 62/772,425, filed on Nov. 28, 2018, provisional application No. 62/772,052, filed on Nov. 27, 2018, provisional application No. 62/729,860, filed on Sep. 11, 2018, provisional application No. 62/640,269, filed on Mar. 8, 2018, provisional application No. 62/516,572, filed on Jun. 7, 2017, provisional application No. 62/515,962, filed on Jun. 6, 2017.

(51) Int. Cl.
*H04W 52/22* (2009.01)
*H04W 52/34* (2009.01)
*H04W 52/36* (2009.01)
*H04W 52/50* (2009.01)

(52) U.S. Cl.
CPC ......... *H04W 52/283* (2013.01); *H04W 52/34* (2013.01); *H04W 52/50* (2013.01)

(56) References Cited

U.S. PATENT DOCUMENTS

| | | |
|---|---|---|
| 7,424,058 B1 | 9/2008 | Staley et al. |
| 7,502,340 B1 | 3/2009 | Chuang et al. |
| 8,134,516 B1 | 3/2012 | Yaghjian et al. |
| 8,159,364 B2 | 4/2012 | Zeine |
| 8,175,660 B2 | 5/2012 | Porwal |
| 8,180,286 B2 | 5/2012 | Yamasuge |
| 8,338,991 B2 | 12/2012 | Von et al. |
| 8,650,418 B2 | 2/2014 | Wu |
| 8,682,318 B2 | 3/2014 | Lee et al. |
| 8,766,544 B2 | 7/2014 | Velazquez |
| 8,772,967 B1 | 7/2014 | Ikriannikov et al. |
| 9,142,990 B2 | 9/2015 | Keeling et al. |
| 9,288,769 B2 | 3/2016 | Tandai et al. |
| 9,306,401 B2 | 4/2016 | Lee et al. |
| 9,368,020 B1 | 6/2016 | Bell et al. |
| 9,425,629 B2 | 8/2016 | Kim et al. |
| 9,544,004 B2 | 1/2017 | Callaway et al. |
| 9,547,099 B2 | 1/2017 | Shih |
| 9,608,454 B2 | 3/2017 | Sankar |
| 9,622,195 B2 | 4/2017 | Ko et al. |
| 9,711,978 B2 | 7/2017 | Manova-Elssibony et al. |
| 9,853,486 B2 | 12/2017 | Liu et al. |
| 9,859,757 B1 | 1/2018 | Leabman et al. |
| 9,876,380 B1 | 1/2018 | Leabman et al. |
| 9,882,427 B2 | 1/2018 | Leabman et al. |
| 9,893,555 B1 | 2/2018 | Leabman et al. |
| 9,967,462 B2 | 5/2018 | Kimura et al. |
| 10,021,523 B2 | 7/2018 | Leabman |
| 10,069,592 B1 | 9/2018 | Krunz et al. |
| 10,135,257 B1 | 11/2018 | Adolf et al. |
| 10,148,320 B2 | 12/2018 | Shin et al. |
| 10,181,729 B1 | 1/2019 | Devaul et al. |
| 10,193,390 B2 | 1/2019 | Riehl |
| 10,199,849 B1 | 2/2019 | Bell et al. |
| 10,341,967 B2 | 7/2019 | Navarro et al. |
| 10,381,878 B1* | 8/2019 | Grundmann ........... H01R 27/02 |
| 10,424,973 B1 | 9/2019 | Navarro et al. |
| 10,548,099 B2 | 1/2020 | Navarro et al. |
| 10,778,044 B2 | 9/2020 | Navarro et al. |
| 10,798,665 B2 | 10/2020 | Navarro et al. |
| 10,820,283 B2 | 10/2020 | Davlantes et al. |
| 10,826,630 B2* | 11/2020 | Tankielun ............... G01R 29/10 |
| 10,827,445 B2 | 11/2020 | Navarro et al. |
| 10,952,162 B2 | 3/2021 | Navarro et al. |
| 10,992,159 B2* | 4/2021 | Katabi ................. H02J 50/402 |
| 11,178,625 B2 | 11/2021 | Navarro et al. |
| 11,611,242 B2 | 3/2023 | Davlantes et al. |
| 2002/0111905 A1 | 8/2002 | Nagafuchi et al. |
| 2004/0203846 A1 | 10/2004 | Caronni et al. |
| 2005/0090287 A1 | 4/2005 | Rofougaran |
| 2005/0170788 A1 | 8/2005 | Tanaka et al. |
| 2006/0088123 A1 | 4/2006 | Jensen et al. |
| 2007/0155347 A1 | 7/2007 | Heuermann et al. |
| 2007/0156343 A1 | 7/2007 | Rayan et al. |
| 2007/0210899 A1 | 9/2007 | Kato et al. |
| 2007/0243851 A1 | 10/2007 | Shoarinejad et al. |
| 2008/0057880 A1 | 3/2008 | Copeland |
| 2008/0225639 A1 | 9/2008 | Hongou |
| 2009/0210366 A1 | 8/2009 | Sakata et al. |
| 2009/0284082 A1 | 11/2009 | Mohammadian |
| 2010/0033021 A1 | 2/2010 | Bennett |
| 2010/0181961 A1 | 7/2010 | Novak et al. |
| 2010/0201203 A1* | 8/2010 | Schatz ..................... H01Q 7/00 |
| | | 307/104 |
| 2010/0222010 A1 | 9/2010 | Ozaki et al. |
| 2010/0226448 A1 | 9/2010 | Dent |
| 2011/0141148 A1 | 6/2011 | Hill et al. |
| 2011/0148215 A1 | 6/2011 | Marzetta et al. |
| 2011/0156640 A1 | 6/2011 | Moshfeghi |
| 2011/0216564 A1 | 9/2011 | Swamy |
| 2011/0224817 A1 | 9/2011 | Dubrov et al. |
| 2011/0281535 A1 | 11/2011 | Low et al. |
| 2011/0282535 A1 | 11/2011 | Woody et al. |
| 2012/0109606 A1 | 5/2012 | Dotan et al. |
| 2012/0146425 A1 | 6/2012 | Lee et al. |
| 2012/0217818 A1 | 8/2012 | Yerazunis et al. |
| 2012/0218799 A1 | 8/2012 | Furukawa et al. |
| 2012/0281556 A1 | 11/2012 | Sayana et al. |
| 2012/0300592 A1 | 11/2012 | Perry |
| 2012/0313450 A1 | 12/2012 | Nam et al. |
| 2012/0326660 A1 | 12/2012 | Lu et al. |
| 2013/0043734 A1 | 2/2013 | Stone et al. |
| 2013/0043735 A1* | 2/2013 | Low ........................ H04B 5/79 |
| | | 307/104 |
| 2013/0057078 A1 | 3/2013 | Lee et al. |
| 2013/0066471 A1 | 3/2013 | Wang et al. |
| 2013/0102345 A1 | 4/2013 | Jung |
| 2013/0113299 A1 | 5/2013 | Von et al. |
| 2013/0154381 A1 | 6/2013 | Cain et al. |
| 2013/0288595 A1 | 10/2013 | Lee et al. |
| 2014/0028110 A1 | 1/2014 | Petersen et al. |
| 2014/0028111 A1 | 1/2014 | Hansen et al. |
| 2014/0062395 A1 | 3/2014 | Kwon et al. |
| 2014/0070621 A9 | 3/2014 | Von Novak et al. |
| 2014/0106761 A1 | 4/2014 | Lee et al. |
| 2014/0133322 A1 | 5/2014 | Steer et al. |
| 2014/0139034 A1 | 5/2014 | Sankar et al. |
| 2014/0203769 A1 | 7/2014 | Keeling et al. |
| 2014/0214743 A1 | 7/2014 | Chester et al. |
| 2014/0227981 A1 | 8/2014 | Pecen et al. |
| 2014/0239305 A1 | 8/2014 | Shah et al. |
| 2014/0242918 A1 | 8/2014 | Weissman et al. |
| 2014/0361741 A1 | 12/2014 | Von et al. |
| 2014/0375253 A1 | 12/2014 | Leabman et al. |
| 2015/0022009 A1 | 1/2015 | Leabman et al. |
| 2015/0123496 A1 | 5/2015 | Leabman et al. |

(56) References Cited

U.S. PATENT DOCUMENTS

| | | |
|---|---|---|
| 2015/0181539 A1 | 6/2015 | Aiba et al. |
| 2015/0280444 A1 | 10/2015 | Smith et al. |
| 2015/0326061 A1 | 11/2015 | Davison et al. |
| 2015/0349542 A1 | 12/2015 | Yamamoto et al. |
| 2015/0351054 A1 | 12/2015 | Immonen et al. |
| 2015/0357827 A1 | 12/2015 | Muratov et al. |
| 2015/0371771 A1 | 12/2015 | Abu Qahouq |
| 2016/0013656 A1 | 1/2016 | Bell et al. |
| 2016/0026625 A1 | 1/2016 | Walker |
| 2016/0054395 A1 | 2/2016 | Bell et al. |
| 2016/0054396 A1 | 2/2016 | Bell et al. |
| 2016/0056966 A1 | 2/2016 | Bell |
| 2016/0087686 A1 | 3/2016 | Won et al. |
| 2016/0094092 A1 | 3/2016 | Davlantes et al. |
| 2016/0099611 A1 | 4/2016 | Leabman et al. |
| 2016/0099613 A1 | 4/2016 | Bell et al. |
| 2016/0099755 A1 | 4/2016 | Leabman et al. |
| 2016/0099758 A1 | 4/2016 | Bell et al. |
| 2016/0140115 A1 | 5/2016 | Walker |
| 2016/0156268 A1 | 6/2016 | Thomas et al. |
| 2016/0165545 A1 | 6/2016 | Ouchi et al. |
| 2016/0197494 A1 | 7/2016 | Kwon et al. |
| 2016/0216301 A1 | 7/2016 | Holzworth et al. |
| 2016/0233724 A1 | 8/2016 | Bae et al. |
| 2016/0337085 A1 | 11/2016 | Yu et al. |
| 2016/0344431 A1 | 11/2016 | Srirattana et al. |
| 2016/0372948 A1 | 12/2016 | Kvols |
| 2016/0379753 A1 | 12/2016 | Jang et al. |
| 2017/0025885 A1 | 1/2017 | Blakely et al. |
| 2017/0077736 A1 | 3/2017 | Leabman |
| 2017/0194815 A1* | 7/2017 | Mach ............... H02J 50/12 |
| 2017/0201289 A1 | 7/2017 | Zhang et al. |
| 2017/0222469 A1 | 8/2017 | Tustin et al. |
| 2017/0261631 A1 | 9/2017 | Donderici et al. |
| 2017/0288738 A1 | 10/2017 | Lee et al. |
| 2017/0366242 A1 | 12/2017 | Lee et al. |
| 2018/0031629 A1* | 2/2018 | Yun ............... G01R 31/3025 |
| 2018/0084406 A1 | 3/2018 | Tandai et al. |
| 2018/0118045 A1 | 5/2018 | Gruzen et al. |
| 2018/0131218 A1* | 5/2018 | Shellhammer ........ H02J 7/007 |
| 2018/0131413 A1 | 5/2018 | Won et al. |
| 2018/0239021 A1 | 8/2018 | Akselrod et al. |
| 2018/0248399 A1 | 8/2018 | Moghaddam et al. |
| 2018/0262060 A1 | 9/2018 | Johnston et al. |
| 2018/0349434 A1 | 12/2018 | Seidel |
| 2018/0352519 A1 | 12/2018 | Navarro et al. |
| 2018/0375340 A1 | 12/2018 | Bell et al. |
| 2019/0011523 A1 | 1/2019 | Avestruz et al. |
| 2019/0013702 A1 | 1/2019 | Muratov |
| 2019/0020225 A1 | 1/2019 | Kwon et al. |
| 2019/0132098 A1 | 5/2019 | Wernersson et al. |
| 2019/0140350 A1 | 5/2019 | Urzhumov et al. |
| 2019/0173324 A1 | 6/2019 | Arnitz et al. |
| 2019/0296547 A1 | 9/2019 | Kelly et al. |
| 2019/0341812 A1 | 11/2019 | Arnstein et al. |
| 2019/0364492 A1 | 11/2019 | Azizi et al. |
| 2020/0266673 A1 | 8/2020 | Reynolds et al. |
| 2020/0396702 A1 | 12/2020 | Navarro et al. |
| 2020/0403451 A1 | 12/2020 | Davlantes |
| 2021/0063605 A1 | 3/2021 | Raeker et al. |

FOREIGN PATENT DOCUMENTS

| | | |
|---|---|---|
| CN | 103683523 A | 3/2014 |
| CN | 104584448 A | 4/2015 |
| CN | 104702105 A | 6/2015 |
| CN | 104718708 A | 6/2015 |
| CN | 103427498 B | 3/2018 |
| EP | 3625582 B1 | 2/2021 |
| JP | 2003108972 A | 4/2003 |
| JP | 2009048353 A | 3/2009 |
| JP | 2013050899 A | 3/2013 |
| JP | 2015039271 A | 2/2015 |
| JP | 2016111791 A | 6/2016 |
| JP | 2017093234 A | 5/2017 |
| JP | 2018050134 A | 3/2018 |
| JP | 2018506251 A | 3/2018 |
| JP | 2018506252 A | 3/2018 |
| WO | 2006080304 A1 | 8/2006 |
| WO | 2016106264 A1 | 6/2016 |
| WO | 2016109316 A1 | 7/2016 |
| WO | 2019173590 A1 | 9/2019 |
| WO | 2021121087 A1 | 6/2021 |
| WO | 2022204191 A2 | 9/2022 |

OTHER PUBLICATIONS

Brown, William C., "The history of power transmission by radio waves" IEEE Transactions on microwave theory and techniques 32, No. 9 (1984): 1230-1242.

Harrington, Roger F., "Effect of Antenna Size on Gain, Bandwidth, and Efficiency", Journal of Research of the National Bureau of Standards—D. Radio Propagation vol. 64D, No. 1, Jan.-Feb. 1960., 12 pages.

Ivrlac, Michel T., "High-Efficiency Super-Gain Antenna Arrays", 2010 International ITG Workshop on Smart Antennas (WSA 2010), 369-374.

Kumar, et al., "Memetic search in differential evolution algorithm." In:arXiv preprint. Aug. 1, 2014 Retrieved from <https://arxiv.org/ftp/arxiv/papers/1408/1408.0101.pdf> entire document.

Wang, Shaodi, et al., "Proceed: A Pareto optimization-based circuit-level evaluator for emerging devices", IEEE Transactions on Very Large Scale Integration (VLSI) Systems. Feb. 12, 2015.

Younesiraad, Hemn, et al., "Optimal Huygens Metasurface for Wireless Power Transfer Efficiency improvement", IEEE access [online] Nov. 30, 2020 https://ieeexplore.ieee.org/document/9273051 Digital Object Identifier 10.1109/ACCESS.2020.3041337.

* cited by examiner

METHOD AND SYSTEM FOR WIRELESS POWER DELIVERY

CROSS-REFERENCE TO RELATED APPLICATIONS

This application is a continuation of U.S. application Ser. No. 17/500,652, filed 13 Oct. 2021, which is a continuation of U.S. application Ser. No. 17/006,242, filed 28 Aug. 2020, which is a continuation-in-part of U.S. application Ser. No. 16/706,131, filed 6 Dec. 2019, which is a continuation-in-part of U.S. application Ser. No. 16/415,664, filed 17 May 2019, which is a continuation of U.S. patent application Ser. No. 16/001,725, filed on 6 Jun. 2018, which claims the benefit of U.S. Provisional Application Ser. No. 62/515,962, filed on 6 Jun. 2017, and U.S. Provisional Application Ser. No. 62/516,572, filed on 7 Jun. 2017, and also a continuation-in-part of U.S. application Ser. No. 16/539,288, filed 13 Aug. 2019, which is a continuation of U.S. application Ser. No. 16/295,684, filed 7 Mar. 2019, which claims the benefit of U.S. Provisional Application Ser. No. 62/640,269 filed on 8 Mar. 2018, U.S. Provisional Application Ser. No. 62/729,860 filed on 11 Sep. 2018, U.S. Provisional Application Ser. No. 62/772,052 filed on 27 Nov. 2018, and U.S. Provisional Application Ser. No. 62/772,425 filed on 28 Nov. 2018, and also a continuation-in-part of U.S. application Ser. No. 16/698,196, filed 27 Nov. 2019, which claims the benefit of U.S. Provisional Application Ser. No. 62/773,935, filed on 30 Nov. 2018, and of U.S. Provisional Application Ser. No. 62/888,817, filed on 19 Aug. 2019 and U.S. application Ser. No. 16/706,131, filed 6 Dec. 2019 also claims priority to U.S. Provisional Application Ser. No. 62/817,063, filed on 12 Mar. 2019, each of which is incorporated in its entirety by this reference.

TECHNICAL FIELD

This invention relates generally to the wireless power delivery field, and more specifically to a new and useful method and system in the wireless power delivery field.

BACKGROUND

Typical wireless power delivery systems restrict themselves to beamforming configurations, which may not offer high-performance results. Thus, there is a need in the wireless power delivery field to create a new and useful method and system for wireless power delivery.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
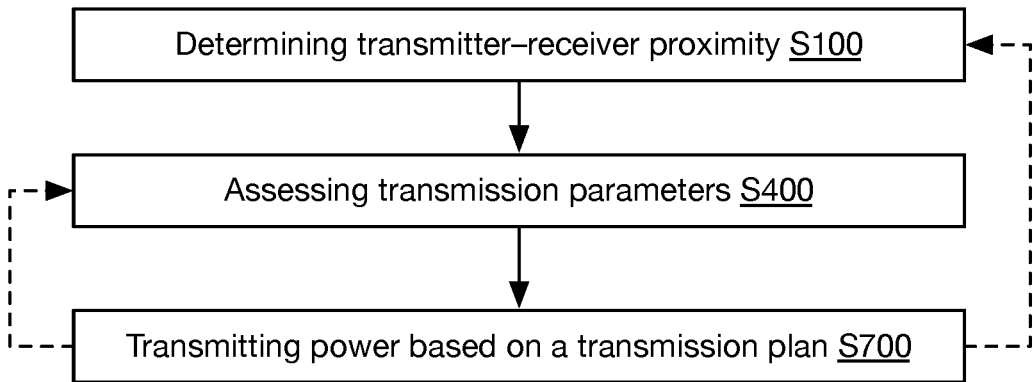
FIG. 1A is a schematic representation of an embodiment of the method.

A method for wireless power delivery preferably includes: determining transmitter-receiver proximity S100, assessing transmission parameters S400, and/or transmitting power based on a transmission plan S700 (e.g., as shown in FIGS. 1A and/or 3). A system for wireless power delivery preferably includes a plurality of receivers and one or more transmitters (e.g., as shown in FIGS. 2A-2D). In embodiments in which the system includes multiple transmitters, the method can optionally include one or more elements such as described in U.S. patent application Ser. No. 16/706,131, filed 6 Dec. 2019 and titled "Method and System for Wireless Power Delivery", which is herein incorporated in its entirety by this reference; for example, the method can be performed such as described in U.S. patent application Ser. No. 16/706,131, but wherein the element described therein as 'determining transmission parameter values S200' can instead be performed such as described herein regarding 'assessing transmission parameters S400' (and/or can include one or more elements described herein, while also retaining one or more elements such as described in U.S. patent application Ser. No. 16/706,131). However, the system and/or method can additionally or alternatively include any other suitable elements. The method is preferably performed using the system described above, but can additionally or alternatively be performed using any other suitable system(s).

Determining power transmission settings for efficient wireless power delivery using typical methods and systems can be difficult and/or time-intensive. Assessment of candidate power transmission settings can be a slow process (e.g., requiring 1-100 ms or more). In addition, the power transmission settings typically involve a large number of parameters, and so the search space can be very large, effectively precluding its full exploration. Further, the elements of the system and the surrounding element may move frequently, potentially invalidating prior solutions and necessitating a new search. In light of these problems, the inventors have discovered that a rapidly-determined solution (e.g., a solution resulting in power transmission within a threshold range of a limit or optimal result) can be superior to a globally-optimal solution found only after a lengthy search.

2. Benefits

The method can significantly reduce the time needed to determine acceptable and/or desirable power transmission settings. First, the method can include performing a local search or stochastic global search, which can typically find a sufficient solution in much less time than a deterministic global search. Further, the method can include performing multi-variate and/or multi-objective searches based only on the objective functions for subsets of the receivers (e.g., receiver groups such as pairs of receivers), which can typically find a sufficient solution in much less time than a multi-variate or multi-objective search based on objective functions for all such receivers (e.g., wherein a plurality of optimal configurations for different receiver groups can subsequently be employed to achieve satisfactory power delivery to many receivers), especially for large numbers of receivers (e.g., greater than a threshold number of receivers, such as 2, 3, 4, 5, 10, 5-10, 10-30, greater than 30, etc.). This search time reduction will often produce vastly superior energy transmission results (e.g., in a system with changing element orientations).

Second, evaluation of power transmission settings (e.g., during the local and/or global searches) can be time-consuming, such as due to the need to configure the transmitter according to the settings, measure (e.g., at the receiver or receivers) the result of power transmission using the settings, and/or communicate the results between different entities (e.g., transmit results from the receiver to the transmitter). To reduce such time consumption, the method can optionally include estimating and/or caching the evaluations (e.g., results) and/or associated information (e.g., both for the receiver or receivers currently under consideration, such as for which an optimization search is currently being performed, and for any other suitable receivers of the system, such as any other receivers with a wireless communication link to the transmitter), thereby allowing fast lookup of the estimated and/or cached values in place of full evaluation.

Third, employing power transmission optimization techniques (e.g., real-time optimization techniques, such as optimization over transmission parameters based on measured results associated with the parameters) can enable excitation and/or maintenance of supergaining behavior in receiver and/or transmitter antennas, despite potential changes in environment and/or system configuration. Further, use of pure-tone (and/or substantially pure-tone) signals for power transmission can make use of such supergaining antennas feasible, despite the narrow bandwidths (e.g., fractional impedance bandwidths) typically associated with such antennas (e.g., arising from the high-energy evanescent fields typically generated in and/or around such antennas). Supergaining antennas can exhibit much higher gain than typical antennas, thereby enabling, for example, increased power transmission rates and/or decreased receiver and/or transmitter sizes. However, the method and system can additionally or alternatively confer any other suitable benefits.

3. System

The transmitter(s) of the system preferably includes one or more transmission elements (e.g., elements configured to transmit electromagnetic radiation, such as RF and/or microwave power) such as transmission antennas. The antennas and/or other transmission elements can be narrowband elements (e.g., quality factor greater than a threshold, such as 50, 75, 100, 125, 150, 200, 250, 500, 30-100, 100-150, 150-300, 300-1000, or greater than 1000, etc.), broadband elements (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), and/or have any other suitable bandwidth. The transmission elements can optionally include one or more frequency adaptation elements (e.g., configured to control the transmission and/or resonance frequencies of the transmission elements). In some embodiments, the transmitter includes one or more elements such as described (e.g., regarding the transmitters of the system) in U.S. patent application Ser. No. 16/001,725, filed 6 Jun. 2018 and titled "Method and System for Wireless Power Delivery", which is herein incorporated in its entirety by this reference.

The transmission elements preferably include a plurality of controllable (e.g., adaptive) transmission elements (e.g., loops, monopoles, dipoles, etc.), such as phase- and/or amplitude-controllable elements. For example, the transmission elements can define one or more controllable (e.g., adaptive) antenna arrays (e.g., linear array, planar array, 3-D array, etc.; phased array, electronically controllable array, etc.).

The transmission elements preferably includes a plurality of active elements (e.g., elements, such as antennas, configured to be actively driven by feeds), more preferably independently controllable active antennas (e.g., wherein each active antenna can be individually controlled independent of all other active antennas of the system; wherein groups of active antennas can be controlled together, wherein each group is controllable independently from all other groups; etc.). In a first variation, the amplitude and/or phase at which each active antenna is driven can be independently controlled (e.g., via a separate IQ modulator or phase shifter for each active antenna). In a second variation, the active antennas are separated into one or more antenna groups, wherein the antennas of a group are controlled together (e.g., via a single IQ modulator or phase shifter for each group). For example, the antennas of a group can have a fixed phase offset (e.g., zero offset, such as wherein all antennas of the group have the same phase as each other; non-zero offset; etc.) with respect to each other (e.g., wherein the fixed phase offset is defined by differences in trace lengths between the IQ modulator or phase shifter and each antenna). However, the active antennas can additionally or alternatively be configured in any other suitable manner.

The transmission elements can additionally or alternatively include one or more passive antennas (e.g., configured to electrically and/or resonantly couple to one or more of the active antennas, thereby altering transmission characteristics of the transmitter). In one example, the system is configured to control (e.g., via switches, such as software-controlled switches; via elements with variable electrical properties, such as variable capacitors; etc.) electrical coupling (e.g., connection, resonant coupling, etc.) and/or decoupling of one or more of the passive antennas to one or more electrical components (e.g., passive components, such as resistors, capacitors, and/or inductors; antennas, such as one or more of the active antennas and/or other passive antennas; etc.). In a first example, a plurality of passive antennas can be electrically connected to and/or disconnected from each other (e.g., via switches operable to electrically connect two or more such antennas). In a second example, variable capacitors (e.g., varactors) and/or other variable (e.g., continuously-variable) elements are electrically coupled (e.g., electrically connected) to one or more passive antennas, enabling control of the loading of the passive antennas and/or their coupling to other antennas (e.g., other passive antennas, active antennas, etc.) in the array and/or their feeds (e.g., wherein varying the properties of one or more of the variable elements coupled to the antennas can function to control the net pattern of the array). In a specific example of this second example, an adaptive antenna array includes a single active antenna and a plurality of passive antennas, wherein one or more of the passive antennas are electrically coupled to one or more variable components.

Although referred to herein as antennas (e.g., active antennas, passive antennas, etc.), a person of skill in the art will recognize that the transmission elements can additionally or alternatively include transmission elements (e.g., active transmission elements, passive transmission elements, etc.) of any other suitable types. Although referred to herein as an antenna array, a person of skill in the art will recognize that the transmission elements can additionally or alternatively include arrays of any other suitable transmission elements and/or transmission elements in any other suitable arrangements (e.g., arrangements other than arrays, such as aperiodic arrangements).

The transmitter is preferably coupled to (e.g., electrically coupled to, such as connected by conductive wires; configured to receive power from; etc.) one or more power sources. The power sources can include remote power sources (e.g., power grid, external power generator, external power storage device, etc.) and/or power storage modules (e.g., wherein the power delivery device includes the power storage module(s)). The power storage module preferably includes a battery, more preferably a secondary battery but alternatively a primary battery, but can additionally or alternatively include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, and/or any other suitable power source. The secondary battery can have a lithium phosphate chemistry, lithium ion polymer chemistry, lithium ion chemistry, nickel metal hydride chemistry, lead acid chemistry, nickel cadmium chemistry, metal hydride chemistry, nickel manganese cobalt chemistry, magnesium chemistry, or any other suitable chemistry. The primary battery can have a lithium thionyl chloride chemistry, zinc-carbon chemistry, zinc chloride chemistry, alkaline chemistry, oxy nickel hydroxide chemistry, lithium-iron disulfide chemistry, lithium-manganese oxide chemistry, zinc-air chemistry, silver oxide chemistry, or any other suitable chemistry.

However, the transmitter(s) can additionally or alternatively include any other suitable elements in any suitable arrangements.

The receivers of the system can include one or more antennas (e.g., configured to receive electromagnetic radiation transmitted by the transmitters). The receivers can optionally include and/or be electrically coupled to (e.g., configured to deliver electrical power to) one or more client devices (e.g., batteries and/or battery-containing devices, such as smart phones and/or other electrical and/or electronic user devices). The receivers can optionally include one or more buffer energy stores (e.g., batteries), such as a battery electrically coupled between the antenna(s) and the client device (e.g., between the antenna(s) and an electrical output configured to connect to the client device), which can function as a buffer between the antennas (which may provide power at an uneven rate and/or with uneven characteristics) and the client device (which may require and/or benefit from power provision at a substantially constant rate and/or with substantially constant characteristics, which may be temporarily disconnected from the receiver, etc.). In some embodiments, the receivers include one or more elements such as described (e.g., regarding the receivers of the system) in U.S. patent application Ser. No. 16/001,628, filed 6 Jun. 2018 and titled "System and Method for Wireless Power Reception", and/or in U.S. patent application Ser. No. 16/001,725, filed 6 Jun. 2018 and titled "Method and System for Wireless Power Delivery", each of which is herein incorporated in its entirety by this reference.

The antennas preferably function to receive power (e.g., electromagnetic radiation transmitted to the receiver, preferably propagating or "far-field" radiation but additionally or alternatively evanescent or "near-field" radiation) and to couple the received power into the receiver.

The antennas can include directional antennas, omnidirectional antennas, and/or any other suitable antennas. The antennas can include narrowband elements (e.g., quality factor greater than a threshold, such as 50, 75, 100, 125, 150, 200, 250, 500, 30-100, 100-150, 150-300, 300-1000, or greater than woo, etc.), broadband elements (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), and/or have any other suitable bandwidth. In some embodiments, some or all of the antennas of the transmitter (e.g., active antennas, passive antennas, etc.) and/or receiver include one or more tightly-coupled arrays of resonators, but can additionally or alternatively include a loosely-coupled array, a sparse array, a single resonator, and/or any other suitable antenna elements. The resonators can include resonant loops, cross-resonators, split-ring resonators, electro-inductive-capacitive resonators, other physically small resonators (e.g., small relative to their resonance wavelength), and/or any other suitable resonators. However, the resonators can be otherwise configured.

The antenna(s) can optionally include multiple arrays (and/or other resonator arrangements) arranged with different orientations, which can function to efficiently couple to radiation of different polarizations (e.g., orthogonal polarizations). In a first embodiment, an antenna includes parallel resonator layers (e.g., parallel resonator arrays), each layer having a different in-plane resonator orientation (e.g., orthogonal orientations, oriented at oblique angles, etc.). In a second embodiment, an antenna includes resonators on non-parallel planes (e.g., orthogonal planes, planes oriented at oblique angles, etc.). However, the antenna(s) can additionally or alternatively include any other suitable resonators and/or other antenna elements, and can have any other suitable arrangement. The antenna(s) can be a metamaterial or have any other suitable configuration.

Although referred to herein as antennas (e.g., active antennas, passive antennas, etc.), a person of skill in the art will recognize that the receiver antennas can additionally or alternatively include reception elements of any other suitable types.

The transmitters and receivers can additionally or alternatively be configured to transmit and/or receive energy in any other suitable form (e.g., sonic, optical, etc.), and/or to perform any other suitable role(s). In one embodiment, all or some of the transmitters can additionally function as receivers and/or all or some of the receivers can additionally function as transmitters. For example, the system can include a plurality of equivalent devices, each of which can wirelessly transmit power to and receive power from each of the other devices.

The transmitters and receivers preferably each include a wireless communication module, but can additionally or alternatively include wired communication modules or any other suitable communication modules, or can omit communication modules. The wireless communication modules preferably support (e.g., enable communication using) one or more wireless communication protocols (e.g., WiFi, Bluetooth, BLE, NFC, RF, IR, Zigbee, Z-wave, etc.). However, the transmitters and receivers can additionally or alternatively include any other suitable elements.

The transmitters and receivers preferably have an arbitrary and/or dynamic arrangement with respect to each other. In one example, the system includes a transmitter with a fixed position, and a plurality of receivers, each of which undergo numerous changes in position and orientation (e.g., with respect to the transmitter, each other, etc.) over time. The system can optionally be arranged in a setting in which other nearby objects (e.g., obstacles to wireless power transmission) can also have an arbitrary and/or dynamic arrangement with respect to the elements of the system. However, the system can define any other suitable arrangements.

For client devices with RF-sensitive components (e.g., sensitive electronics), one or more dissipative elements (e.g., dissipative to the RF power transmitted by the power delivery device) can optionally be placed near the RF-sensitive components (and/or any other elements for which it may be desirable to minimize the incident RF intensity). Such placement of dissipative elements may cause transmission optimization algorithms (e.g., as described below regarding the method) to avoid transmission conditions that create high RF intensity near the sensitive components and/or to implement transmission conditions that do not create high RF intensity near the sensitive components. Additionally or alternatively, negative-feedback receivers (e.g., in addition to the receiver(s) described above) can optionally be placed near the RF-sensitive components (and/or any other elements for which it may be desirable to minimize the incident RF intensity). Such negative-feedback receivers preferably include some or all of the elements described above regarding receivers (and/or share some elements, such as a wireless communication module, with the receiver coupled to the client device). For example, the negative-feedback receivers can be substantially identical to the receivers described above (e.g., except for identifiers and/or configurations, such as programming, indicative of and/or associated with their proximity to RF-sensitive components).

In some embodiments, the system includes one or more elements (and/or the entire system) such as described in U.S. patent application Ser. No. 16/001,725, filed 6 Jun. 2018 and titled "Method and System for Wireless Power Delivery", which is herein incorporated in its entirety by this reference. However, the system can additionally or alternatively include any other suitable elements in any suitable arrangement.

4. Method 4.1 Determining Transmitter-Receiver Proximity.

Determining transmitter-receiver proximity S100 can function to indicate an opportunity for wireless power delivery (e.g., from the transmitter to one or more receivers). S100 preferably includes determining a set of receivers that are in range of one or more transmitters (e.g., are in communication range with a transmitter, have established communications with a transmitter, are less than a threshold distance from a transmitter, are expected to be able to receive power from the transmitter at greater than a threshold rate, etc.). For example, S100 can include determining that one or more receivers are in transmission range (e.g., a range enabling efficient power transmission, substantial power transmission, any measurable power transmission, etc.) of the transmitter. Transmitter-receiver proximity is preferably determined using wireless communication (e.g., using the wireless communication modules of the transmitter and receiver). For example, one device can determine that the other is nearby based on establishment of wireless communication between them, wireless communication signal strength (e.g., RSSI), information communicated via wireless connection, and/or any other suitable indications.

Determining transmitter-receiver proximity S100 can additionally or alternatively include optical recognition (e.g., detecting a nearby receiver in an image captured by a camera of a transmitter), receiving a user input (e.g., button press), detecting a change in wireless power delivery, and/or any other suitable elements. For example, a transmitter wirelessly transmitting power to a first receiver can detect the arrival of a second receiver based on a reduction in power delivered to the first receiver.

S100 can additionally or alternatively include determining information about the receivers and/or transmitter(s). The information can include device type (e.g., model, serial number, etc.), power needs (e.g., battery charge state, current power draw, etc.), likely (e.g., typical, planned, predicted, etc.) residence time in proximity, likely position stability while in proximity (e.g., stationary on table, moving in user clothing pocket, etc.), device position (e.g., based on trilateration/triangulation, optical recognition, line-of-sight proximity sensor, device IMU readings, device GPS readings, etc.), and/or any other suitable information. However, S100 can additionally or alternatively include any other suitable elements or be otherwise performed.

4.2 Assessing Transmission Parameters.

Assessing transmission parameters S400 preferably functions to determine one or more transmission parameter value sets (transmission configurations) that can enable efficient power transmission (e.g., from the transmitters to the receivers). S400 is preferably performed in response to determining transmitter-receiver proximity S100, and can additionally or alternatively be performed in response to determining a change in transmission performance and/or needs. However, S400 can additionally or alternatively be performed at any other suitable time. The transmission parameters can include: transmission phase (e.g., relative to a reference phase, such as a transmission phase of a reference antenna) and/or transmission amplitude of one or more antennas, beamforming parameters such as beam orientation (e.g., angles describing the beam orientation, such as azimuthal angle and polar angle), other spatial parameters (e.g., positions and/or orientations of regions of high- and/or low-intensity excitation), supergaining excitation parameters such as supergaining receiver type, position, and/or orientation, passive antenna parameters such as resistance, capacitance, and/or inductance coupled to one or more antennas (e.g., electrical component coupling parameters), and/or any other suitable parameters. In a first example, the transmission parameters include transmission phase and/or amplitude for one or more active antennas and/or antenna groups (e.g., hardware-defined groups, software-defined groups, etc.), preferably for each active antenna of the transmitter (e.g., of the antenna array, such as the phased antenna array or other adaptive antenna array) or transmitters. In a second example, the transmission parameters include beamforming parameters associated with one or more beamforming networks (e.g., Rotman lens, Butler matrix, etc.) defined by the antennas (e.g., wherein one or more antenna groups, such as software-defined antenna groups, each define a separate beamforming network). In a third example, the transmission parameters include supergaining excitation parameters associated with one or more supergaining structures (e.g., antennas, arrays, etc.) defined by the antennas of the transmitter (e.g., wherein one or more antenna groups, such as hardware- and/or software-defined antenna groups, each define a separate supergaining structures) and/or receiver. However, the transmission parameters can additionally or alternatively include any other suitable parameters.

Assessing transmission parameters S400 can optionally include determining one or more antenna groups (e.g., software-defined antenna groups), which can be used to reduce the dimension of the transmission parameter space (e.g., a space defined by the transmission parameters, distinct from a physical space defined by object positions and/or orientations within a spatial region such as a room). For example, rather than independently controlling parameters (e.g., transmission phase and/or amplitude) associated with each active antenna, the dimension of the transmission parameter space can be reduced to parameters associated with each antenna group (e.g., transmission phase and/or amplitude, beamforming parameters, supergaining excitation parameters, etc.). In a first embodiment, the groups are predefined (e.g., based on properties of the transmitter; based on properties of fixed elements near the transmitter, such as for a transmitter installed in a fixed position; etc.). In a second embodiment, the groups are dynamically determined, such as based on statistical analysis and/or machine learning techniques (e.g., using data determined as described below, such as data associated with wireless power received at one or more receivers of the system). For example, principal component analysis and/or clustering techniques (e.g., k-means clustering, X-means clustering, spectral clustering, etc.) can be employed to determine the antenna groups (e.g., wherein highly correlated antennas and/or antenna parameters are grouped together, wherein antennas of a cluster are grouped together, etc.). However, the antenna groups can additionally or alternatively be determined in any other suitable manner, or no antenna groups can be determined.

Figure 1B:
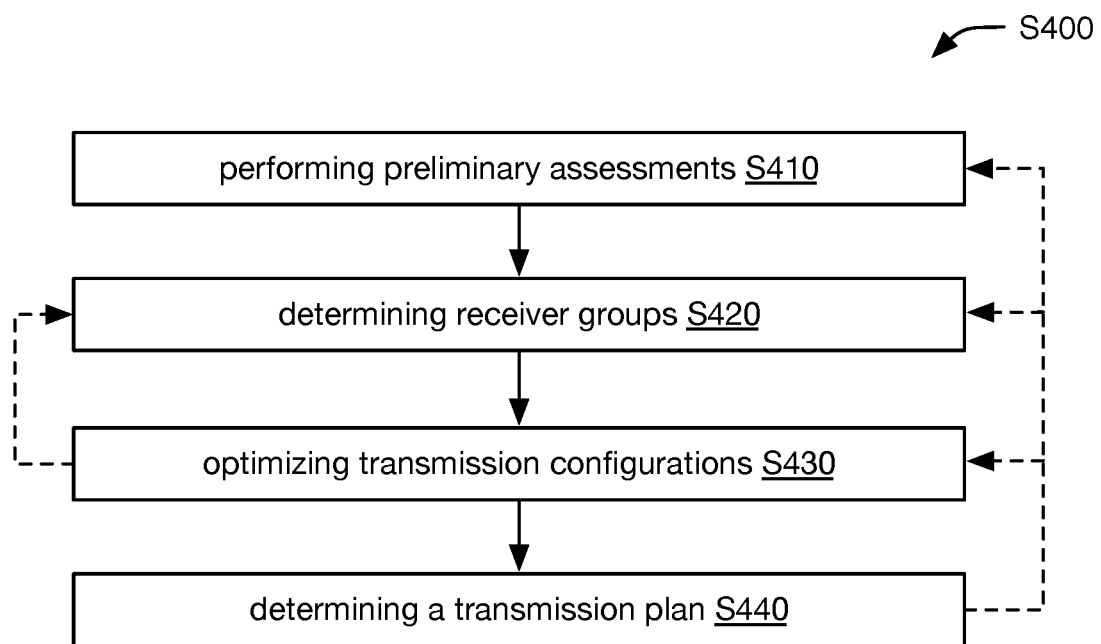
FIG. 1B is a schematic representation of an element of an embodiment of the method.
Figure 1C:
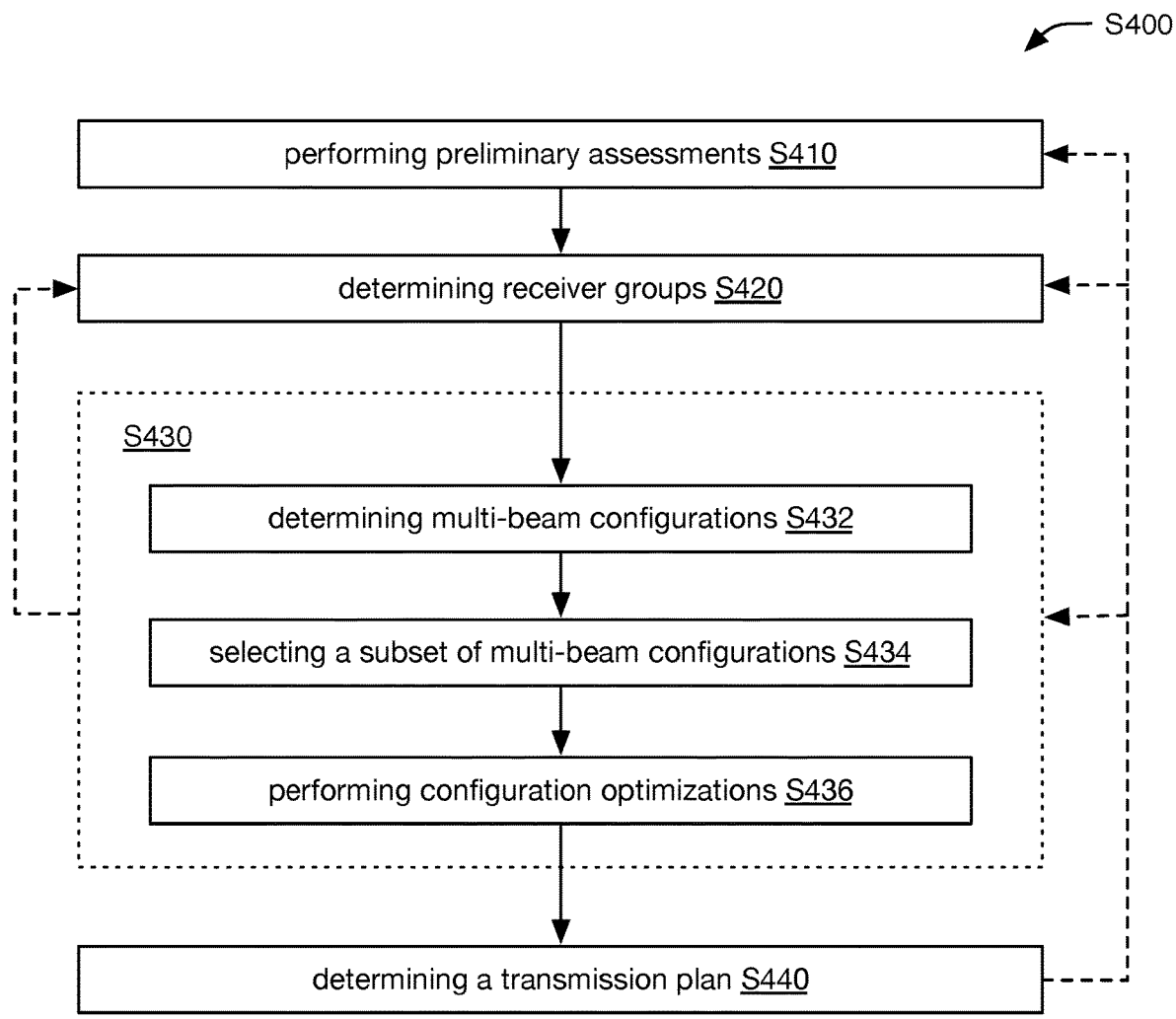
FIG. 1C is a schematic representation of an example of the element depicted in FIG. 1B.
Figure 2A:
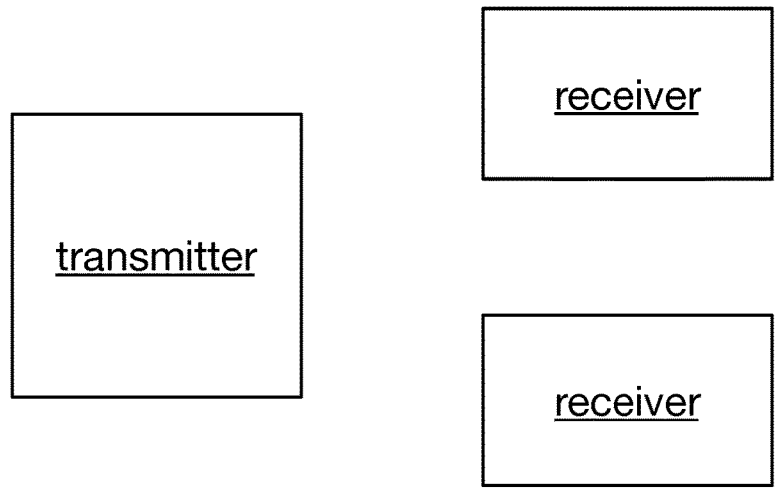
FIG. 2A is a schematic representation of a first embodiment of the system.
Figure 2B:
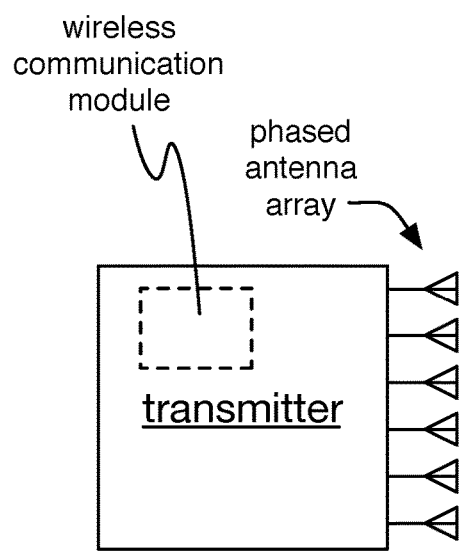
FIGS. 2B-2C are schematic representations of an example of a transmitter and receiver, respectively, of the system.
Figure 2C:
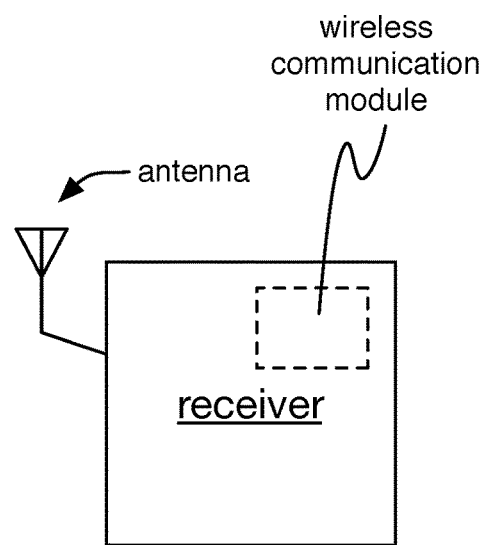
Figure 2D:
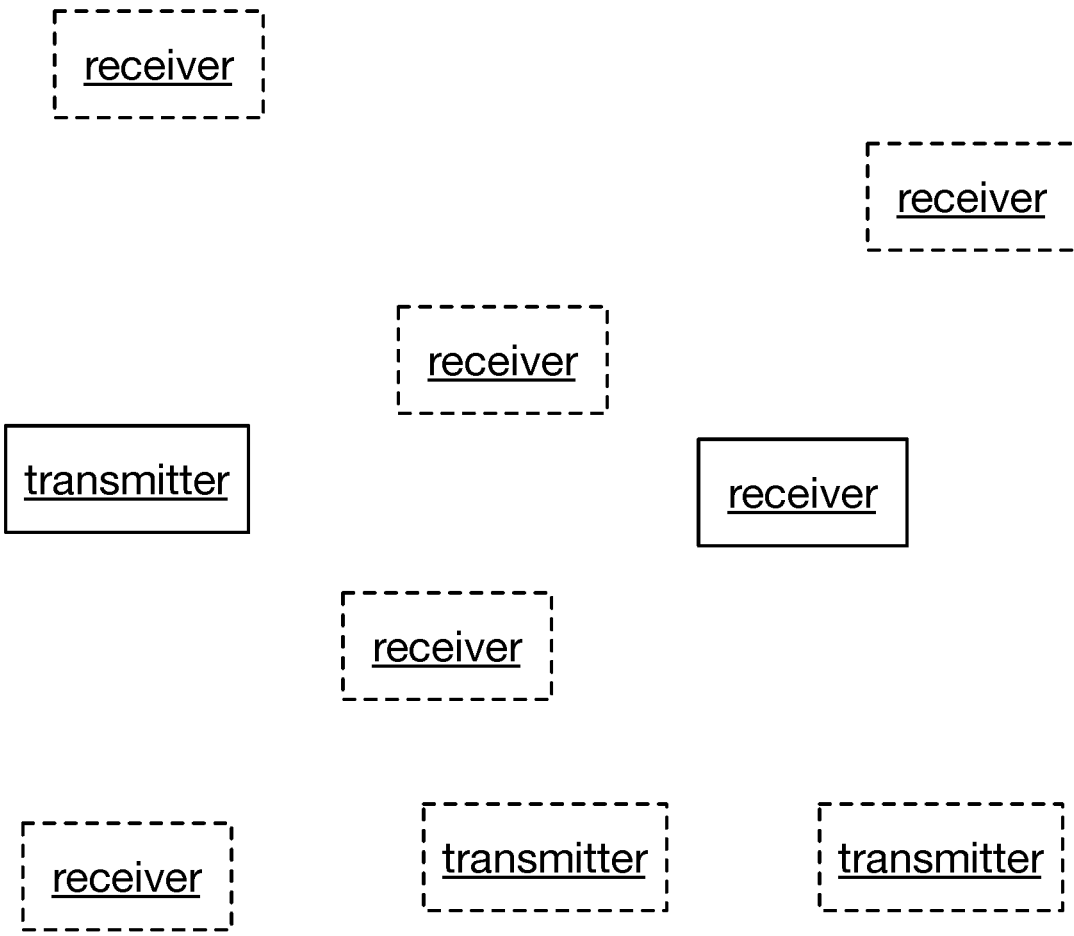
FIG. 2D is a schematic representation of a second embodiment of the system.

S400 preferably includes performing preliminary assessments S410, determining receiver groups S420, optimizing transmission configurations S430, and/or determining a transmission plan S440 (e.g., as shown in FIGS. 1B-1C). However, S400 can additionally or alternatively include assessing transmission parameters in any other suitable manner.

4.2.1 Performing Preliminary Assessments.

Performing preliminary assessments S410 preferably functions to determine a set of mappings between points in the transmission parameter space and the objective space (e.g., space representing power delivery to each receiver), more preferably including points that are close (in transmission parameter space) to one or more efficient transmission configurations for power delivery to one or more of the receivers. S410 is preferably performed in response to determining transmitter-receiver proximity S100, but can additionally or alternatively be performed at any other suitable time.

S410 preferably includes evaluating one or more transmission configurations. Each transmission configuration is preferably evaluated as described in in U.S. patent application Ser. No. 16/001,725, filed 6 Jun. 2018 and titled "Method and System for Wireless Power Delivery", which is herein incorporated in its entirety by this reference (e.g., as described regarding determining transmission parameter values S200, such as regarding evaluating candidate transmission parameter values S220 in particular), but can additionally or alternatively be evaluated in any other suitable manner. For each transmission configuration evaluated, S410 preferably includes determining and/or caching the corresponding objective space values (e.g., the power received at each receiver, such as at each receiver within communication range of the transmitter; values proportional to such power, such as power delivery efficiency, which may be calculated as power received at a receiver divided by a transmission power value such as transmitted power or power consumed by the transmitter; etc.).

In some examples, S410 includes, for each receiver (e.g., each receiver in communication range of the transmitter), performing a search (e.g., a single-value objective function search) to determine the optimal transmitter configuration for that receiver. The search is preferably performed without consideration of the performance of any other receivers. However, information associated with the other receivers' (and/or any negative-feedback receivers') performance (e.g., power received by the other receivers) during the search is preferably determined and/or cached (e.g., for use in subsequent searches such as searches performed as part of S410, for use in determining receiver groups S420 and/or optimizing transmission configurations S430, etc.). The search can be performed as described in U.S. patent application Ser. No. 16/001,725, filed 6 Jun. 2018 and titled "Method and System for Wireless Power Delivery", which is herein incorporated in its entirety by this reference (e.g., as described regarding determining transmission parameter values S200) and/or in any other suitable manner.

This search is preferably restricted to beam-like patterns (e.g., as described in U.S. patent application Ser. No. 16/001,725, filed 6 Jun. 2018 and titled "Method and System for Wireless Power Delivery", which is herein incorporated in its entirety by this reference, such as described regarding beamforming and/or beam-like patterns), such as a search over a beamforming parameter space (e.g., over a space defined by the azimuthal angle and polar angle of a beam-like pattern). Accordingly, the search preferably results in determining an estimated angular position of each receiver (e.g., represented by the azimuthal angle and polar angle of the optimal beam-like pattern for that receiver), and can optionally result in determining a metric associated with the optimal beam-like pattern (e.g., power received by the receiver, power delivery efficiency, etc.). Due to the limited dimensionality of the search space (e.g., two dimensions, corresponding to the azimuthal angle and polar angle, respectively), the search of beam-like patterns is preferably a global search (e.g., exhaustive global search, deterministic global search, stochastic global search, etc.) but can additionally or alternatively include a local search and/or any other suitable search technique(s).

However, the search can additionally or alternatively include searching over transmission configurations that are not limited to beam-like patterns. In some such embodiments, this search is limited to a local optimum search (e.g., as described in U.S. patent application Ser. No. 16/001,725 regarding performing a local optimum search S230), whereas in other such embodiments, the search for some or all of the receivers may include a global optimum search (e.g., as described in U.S. patent application Ser. No. 16/001,725 regarding performing a global optimum search S240). In such embodiments, the method can optionally include determining (e.g., calculating based on transmission parameters) one or more regions of high RF field intensity for an optimized transmission configuration, and, based on this region (or regions), determining location information about the receiver for which the optimization was performed (e.g., determining that the receiver is likely to be located near the highest-intensity region).

Additionally or alternatively, performance of one or more other receivers can be considered during performance of this search. In examples, the objective function on which the search is based can be a function of the performance of multiple receivers (e.g., a multivariable function of the power received at each receiver and/or any other suitable multivariable function, such as described in U.S. patent application Ser. No. 16/001,725, filed 6 Jun. 2018 and titled "Method and System for Wireless Power Delivery", which is herein incorporated in its entirety by this reference), and/or the search can be a multi-objective search (e.g., wherein each objective function is associated with a different receiver or different receiver set). In variations in which the system includes one or more negative-feedback receivers (e.g., arranged in proximity to RF-sensitive components), power received at one or more negative-feedback receivers can be considered during performance of this search. For example, the objective function(s) can include one or more penalty terms associated with power delivery to one or more of the negative-feedback receivers (e.g., wherein the objective function value is improved by reducing power delivery to the negative-feedback receivers).

However, S410 can additionally or alternatively include performing preliminary assessments in any other suitable manner.

4.2.2 Determining Receiver Groups.

Determining receiver groups S420 preferably functions to determine one or more groups of receivers that may be able to (e.g., are expected to) perform well under the same transmission configuration. Preferably, for each receiver group, it is expected to be possible to determine a transmission configuration under which rapid and/or efficient power transmission (e.g., in excess of a threshold value) is achieved to each receiver of the respective group.

S420 is preferably performed in response to S410 (e.g., upon completion of S410), but can additionally or alternatively be performed at any other suitable time.

S420 preferably includes determining a set of receiver groups. Each group preferably includes a small number of receivers (e.g., 2 or 3 receivers) but can additionally or alternatively include larger numbers of receivers (e.g., 4, 5, 6-10, more than 10, etc.). The set of receiver groups preferably spans all the receivers (e.g., each receiver is included in at least one receiver group). The receiver groups can be disjoint or overlapping. In some examples, the number of receiver groups is greater than (e.g., much greater, than such as more than double, more than 10 times, etc.) the number of receivers (e.g., each receiver belongs to multiple receiver groups).

In a first embodiment, every possible combination of a desired group size or sizes is used as a different receiver group. For example, for a desired group size of 2-3 receivers, S420 can include selecting every possible pair of receivers and every possible triplet of receivers as a different receiver group.

In a second embodiment, the receivers are grouped based on spatial considerations (e.g., wherein receivers near each other in the physical space, and/or arranged in similar directions from the transmitter, may be grouped together). In this embodiment, determining receiver groups preferably includes determining subsets (e.g., disjoint and/or overlapping subsets) of receivers based on spatial considerations, and then selecting receiver groups from those subsets.

In this embodiment, the proximity of receivers to each other is preferably determined based on information determined in S410 (e.g., direction from the transmitter to receiver, such as represented by azimuthal and polar angles; proxies for distance to the transmitter, such as determined based on power transmission efficiency; etc.). Note that the angles of the beam-like patterns may not represent the true locations of the receivers, but rather represent 'energy-transmission directions' from the transmitter to the receivers (e.g., wherein a beam-like pattern directs energy toward a reflective element, which then redirects the energy to a receiver). Accordingly, the receiver groupings may not be based on true spatial location, but rather location in an energy-transmission space associated with these energy-transmission directions.

However, in this embodiment, receiver proximity can additionally or alternatively be determined based on auxiliary information, such as received signal strength indications (e.g., RSSI determined at a receiver wireless communication module, based on signals received from another receiver's wireless communication module), spatial sensors (e.g., of the receivers, transmitter, auxiliary devices, etc.), imaging data (e.g., sampled by the receivers, transmitter, auxiliary devices, etc.), and/or any other suitable information (e.g., such as described above regarding determining transmitter-receiver proximity S100).

In one example of this embodiment, the subsets of receivers can be determined based on angular distance between the receivers. For example, a subset can include all receivers falling within a conical region (with apex at the transmitter) having a threshold apex angle (twice the angle from the cone central axis to its surface), such as an apex angle of 10°, 15°, 20°, 25°, 30°, 35°, 40°, 50°, 60°, 5-15°, 15-25°, 20-30°, 30-45°, 45-60°, etc. In a variation of this example, the subsets can additionally or alternatively be restricted based on the metric (e.g., power, power delivery efficiency, etc.) associated with the receiver and/or based on the distance between receivers (e.g., determined based on auxiliary information), such as wherein only receivers within the conical region and within a threshold distance (e.g., spatial distance, difference in power delivery metric, etc.) are placed in the same subset. In some variations, the subsets (and/or receiver groups) are determined using one or more statistical and/or machine learning techniques, such as classification algorithms (e.g., clustering algorithms), preferably performed based on the spatial information (e.g., angular information such as azimuthal and/or polar angle, distance information such as the power delivery metric, spatial information determined based on auxiliary information, etc.) and/or derivatives thereof, and/or based on any other suitable information. The clustering can be performed using, for example, k-means clustering, X-means clustering, spectral clustering, and/or any other suitable clustering techniques.

In this embodiment, every possible combination of a desired group size or sizes, selected entirely from a single subset, is preferably used as a different receiver group. For example, for a desired group size of 2-3 receivers, selecting receiver groups from the subsets can include, for each subset, selecting every possible pair of receivers in the subset and every possible triplet of receivers in the subset as a different receiver group. However, the receiver groups can additionally or alternatively be determined in any other suitable manner.

In a third embodiment, the groups are determined randomly. In a sixth embodiment, all possible receiver groups of a particular size (e.g., all pairs, all triplets, all groups of size 4, etc.) or sizes are used.

In a fourth embodiment (e.g., in which S410 preferably includes performing one or more optimizations that are not restricted to beam-like patterns, in which S430 preferably includes performing multi-objective optimizations, etc.), the groups are determined such as described in U.S. patent application Ser. No. 16/539,288, filed 13 Aug. 2019 and titled "Method and System for Wireless Power Delivery", which is herein incorporated in its entirety by this reference (e.g., as described in U.S. patent application Ser. No. 16/539,288 regarding 'determining receiver groups S420'). However, the receiver groups can additionally or alternatively be determined in any other suitable manner.

S420 can optionally include removing one or more receivers (e.g., receivers for which a sufficiently high power delivery is difficult or impossible to achieve) from consideration, such as by not including the receiver in any receiver groups. For example, for each receiver (or a subset thereof), if no known transmission configuration achieves an objective function value (for the objective function associated with the receiver under consideration) greater than a threshold value (e.g., predetermined value; value relative to the receiver's power consumption and/or state of charge; value relative to the other objective function values, such as the average or lowest objective function maximum; etc.), the receiver can be removed from consideration. However, receivers can be additionally or alternatively removed from consideration based on any other suitable determination.

In some embodiments, S400 can optionally include determining receiver groups S420 during and/or after optimizing transmission configurations S430 (e.g., based on the results of one or more of the optimizations, such as based on the objective function values). For example, S420 can be repeated to revise the receiver groups (and/or determine new groups), such as based on the results of one or more preliminary optimizations (e.g., wherein S430 is performed using lenient convergence criteria, performed for a short time or number of cycles, etc.), such as described by way of examples in U.S. patent application Ser. No. 16/539,288, filed 13 Aug. 2019 and titled "Method and System for Wireless Power Delivery", which is herein incorporated in its entirety by this reference (e.g., as described in U.S. patent application Ser. No. 16/539,288 regarding determining receiver groups during and/or after performing multi-objective optimizations).

However, S420 can additionally or alternatively include determining receiver groups in any other suitable manner, at any other suitable time, and/or based on any other suitable information.

4.2.3 Optimizing Transmission Configurations.

Optimizing transmission configurations S430 preferably functions to determine one or more performant transmission configurations (e.g., one configuration for each receiver group, a plurality of configurations close to one or more Pareto fronts, etc.). S430 preferably includes: determining multi-beam configurations S432, selecting a subset of multi-beam configurations S434, and/or performing configuration optimizations S436 (e.g., as shown in FIG. 1C).

Figure 3:
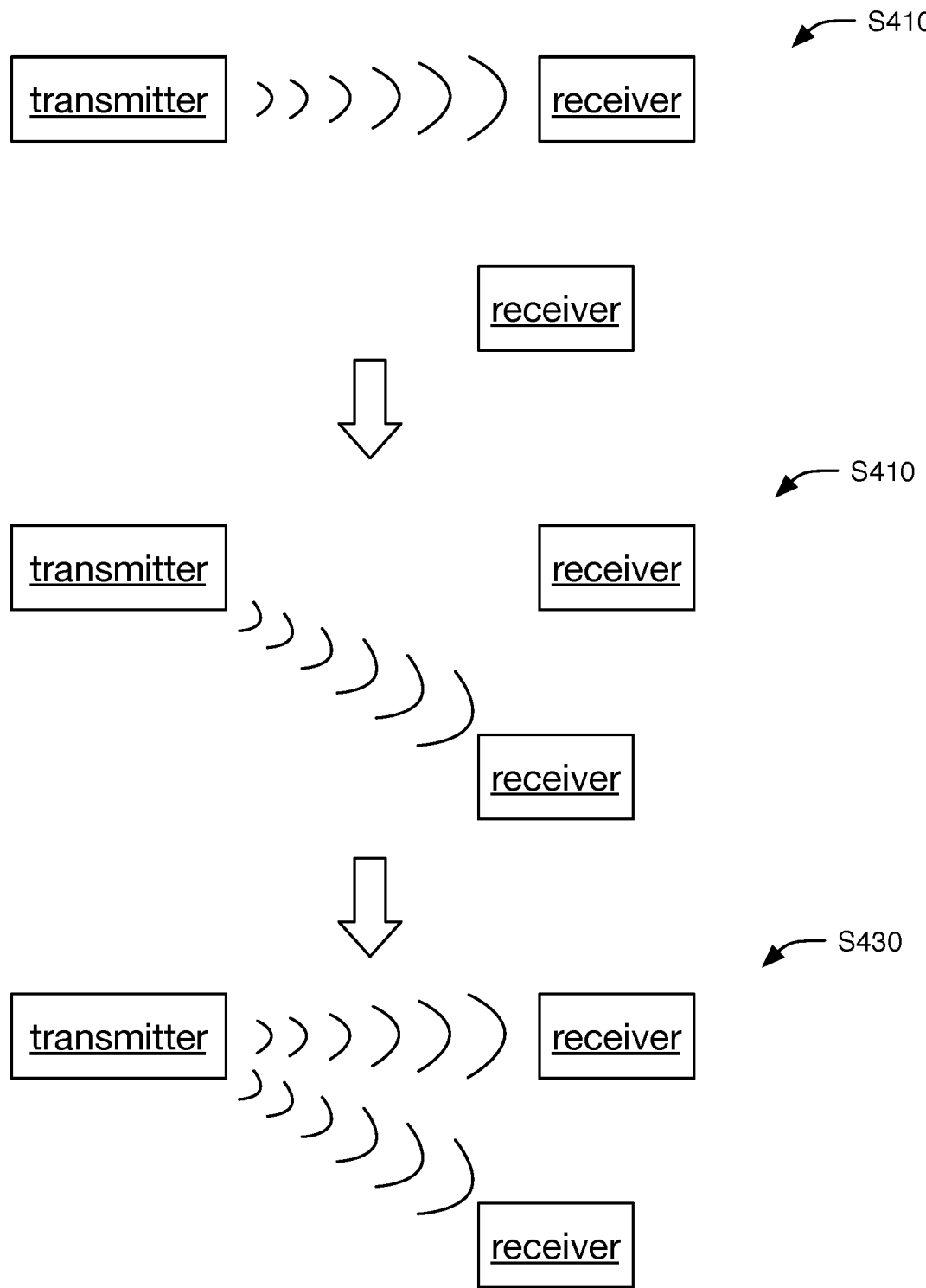
FIG. 3 is a schematic representation of an element of an example of the method.

Determining multi-beam configurations S432 preferably functions to determine a multi-beam configuration (e.g., transmission configuration resulting in several beam-like elements propagating in different directions, such as transmission parameter values resulting in such a multi-beam transmission pattern) for each receiver group (e.g., each group determined in S420), more preferably wherein each beam-like element of the multi-beam pattern is substantially directed toward a different receiver of the group (e.g., in 'energy-transmission space', if not in terms of true spatial locations), such as shown by way of example in FIG. 3. However, S432 can additionally or alternatively include determining multi-beam configurations for any suitable subset of the receiver groups, and/or determining any other suitable multi-beam configurations.

The multi-beam configuration is preferably calculated (e.g., rather than being partially or entirely determined based on iterative assessment of transmission configurations, such as via power transmission to and communication with the receivers). For example, the multi-beam configuration can be calculated at the transmitter and/or at a control element that controls operation of and/or communicates with the transmitter. One or more approaches to calculating the multi-beam configuration can be employed (e.g., as described in Balanis, Constantine A. Antenna Theory: Analysis and Design. United Kingdom, Wiley, 2016, which is herein incorporated in its entirety by this reference).

In a first example, the configuration is calculated using a Fourier transform-based approach (e.g., as described in Booker, H. G., & Clemmow, P. C. (1950). The concept of an angular spectrum of plane waves, and its relation to that of polar diagram and aperture distribution. Proceedings of the IEE-Part III: Radio and Communication Engineering, 97(45), 11-17, which is herein incorporated in its entirety by this reference).

In a second example, the configuration is calculated using the Woodward-Lawson method (e.g., as described in Woodward, P. M. (1946). A method of calculating the field over a plane aperture required to produce a given polar diagram. Journal of the Institution of Electrical Engineers-Part IIIA: Radiolocation, 93(10), 1554-1558 and/or in Woodward, P. M., & Lawson, J. D. (1948). The theoretical precision with which an arbitrary radiation-pattern may be obtained from a source of finite size. Journal of the Institution of Electrical Engineers-Part III: Radio and Communication Engineering, 95(37), 363-370, each of which is herein incorporated in its entirety by this reference).

In a third example, the configuration is calculated using an error optimization approach. For example, this approach can include: determining desired values (e.g., field intensity values) at a set of locations in space (e.g., determining spatial samples of a desired pattern at each location of the set); determining a candidate configuration; determining values at the set of locations resulting from the candidate configuration (e.g., wherein the resulting values are preferably calculated based on the candidate configuration, but can additionally or alternatively be sampled based on actual transmission based on the candidate configuration); determining an error (e.g., least-mean-square error) associated with the candidate configuration (e.g., based on the different between the desired values and the determined values for the candidate configuration); and performing an optimization technique (e.g., over a space defined by the transmission configuration parameters, such as the amplitude and/or phase associated with each transmission element) to minimize this error, which preferably includes iteratively selecting new candidate configurations (e.g., based on the optimization technique, such as according to an optimization algorithm) and determining the associated errors.

In a fourth example, the configuration is calculated using a superposition approach. For example, this approach can include: for each receiver in the receiver group (e.g., based on the location of the receiver, such as based on both the direction and distance from the transmitter to the receiver), determining a phase offset for each transmission element of the transmitter (e.g., based on differences in distance between the receiver and each transmission element); and generating a superposition (e.g., average, weighted average, etc.) of the phase offsets associated with each receiver.

In a fifth example, the configuration is calculated using a combination of one or more of the examples described above and/or any other suitable approaches to multi-beam configuration calculation. However, S432 can additionally or alternatively include determining multi-beam configurations in any other suitable manner.

Selecting a subset of multi-beam configurations S434 preferably functions to select performant configurations from the multi-beam configurations determined in S432. In an alternative embodiment, S434 is not performed (e.g., wherein every multi-beam configuration determined in S432 is available for use in S436). S434 preferably includes, for each multi-beam configuration determined in S432, determining its performance and comparing that performance with a threshold performance value.

Determining performance of a configuration preferably includes evaluating the configuration as described in in U.S. patent application Ser. No. 16/001,725, filed 6 Jun. 2018 and titled "Method and System for Wireless Power Delivery", which is herein incorporated in its entirety by this reference (e.g., as described regarding determining transmission parameter values S200, such as regarding evaluating candidate transmission parameter values S220 in particular), but can additionally or alternatively be evaluated in any other suitable manner. For each configuration, its performance is preferably assessed in association with the receivers of receiver group for which it was generated (e.g., the performance of the configuration is based on a power delivery metric for each receiver of the receiver group); however, its performance for other receivers of the system can optionally be determined (and/or cached) as well.

The threshold performance value is preferably determined based on the associated receiver group (e.g., based on the expected achievable power delivery metric for the receivers of the group). For example, the threshold value can be determined based on, for each receiver of the group, a metric associated with power transmission to the receiver (e.g., the optimized single-beam or optimized arbitrary-pattern single receiver power delivery metric). In a specific example, the threshold value is equal to a threshold fraction (e.g., 50%, 60%, 70%, 80%, 90%, 95%, 100%, 20-50%, 50-75%, 75-90%, 90-100%, greater than 100%, etc.) of the average of the optimized single-beam metric for each receiver of the group (e.g., in a receiver group with 3 receivers, having single-beam power delivery efficiencies of 0.4, 0.6, and 0.7, respectively, the threshold performance value could be equal to 80% of the average power delivery efficiency, which is approximately 0.453).

However, the threshold performance value can additionally or alternatively be determined based on any other suitable receivers (e.g., based on the metric associated with power transmission to the receiver, such as the optimized single-beam or optimized arbitrary-pattern single receiver power delivery metric), based on performance of other multi-beam configurations (and/or any other suitable configurations), based on predetermined values, and/or based on any other suitable information.

All configurations having performance better than the threshold performance value are preferably included in the selected subset. However, the subset can additionally or alternatively be selected in any other suitable manner. For example, the subset can be limited only to a threshold number of configurations (e.g., possibly excluding configurations that are better than the threshold performance value), required to include at least a threshold number of configurations (e.g., possibly including configurations that are worse than the threshold performance value), and/or can be required to include configurations from receiver groups that span the set of receivers. However, S434 can additionally or alternatively include selecting any other suitable subset in any other suitable manner.

Performing configuration optimizations S436 preferably functions to improve the multi-beam configurations (e.g., some or all of the configurations selected in S434, the configurations determined in S432, etc.). S436 is preferably performed for each configuration of the subset selected in S434, but can additionally or alternatively be performed for a subset thereof and/or for any other suitable transmission configurations.

For each configuration (e.g., multi-beam configuration) to be optimized, S436 preferably includes performing the optimization such as described in U.S. patent application Ser. No. 16/715,266, filed 16 Dec. 2019 and titled "Method and System for Wireless Power Delivery", which is herein incorporated in its entirety by this reference. The optimization is preferably performed as described in U.S. patent application Ser. No. 16/715,266 regarding 'determining transmission parameter values S200' (e.g., regarding 'performing a local optimum search S230' and/or 'performing a global optimum search S240'), wherein the configuration to be optimized is preferably used as the initial parameter values for the optimum search or searches (e.g., local search, global search such as stochastic global search, etc.).

The configuration is preferably optimized based on a multi-variate objective function, such as a function dependent on the performance of a plurality of the receivers (e.g., the receivers of the receiver group associated with the configuration to be optimized). In a first example, the objective function can be equal to the sum (or average, weighted average, etc.) of the performance metric (e.g., power, power delivery efficiency, etc.) for each receiver considered (e.g., each receiver of the group); such an objective can function to maximize the total power delivered to the receivers of the group. In a second example, the objective function can be equal to the sum (or average, weighted average, etc.) of a non-linear (preferably sub-linear) function of the performance metrics of the receivers considered, such as the sum of the logarithm of each metric; such an objective can function to prioritize improving power transmission to the receivers that are receiving the least power, even if it results in a greater reduction in power transmission to more performant receivers (e.g., prioritizing evening out performance between the receivers). In some variants, the objective function can be a weighted sum or average of values associated with the receivers considered. For example, S436 can include increasing the weights associated with receivers that require faster power delivery (e.g., receiver associated with a low stored energy state, receiver providing more power to a device than the receiver is receiving, receiver providing power to a device for which the consequences of power loss are high, any other suitable receiver prioritization, etc.) and/or decreasing the weights associated with receivers that do not require as rapid power delivery (e.g., receiver associated with a high stored energy state, receiver not providing significant power to any devices, receiver providing power only to devices for which the consequences of power loss are low, any other suitable receiver prioritization, etc.); in a specific example, the weights for one or more receivers can be set to zero (e.g., if the receiver is associated with a full energy storage device and/or is not providing power to any other devices). In some examples, the receiver prioritization can be determined such as described in U.S. patent application Ser. No. 16/715,266, filed 16 Dec. 2019 and titled "Method and System for Wireless Power Delivery", which is herein incorporated in its entirety by this reference, and/or can be determined based on the metric associated with desired power delivery described below (and/or based on analogous information as described below for determining such a metric). However, S436 can additionally or alternatively include performing optimizations based on any other suitable objective function(s).

In some embodiments, S436 can include performing one or more multi-objective searches (e.g., as described in U.S. patent application Ser. No. 16/539,288, filed 13 Aug. 2019 and titled "Method and System for Wireless Power Delivery", and/or in U.S. patent application Ser. No. 16/899,473, filed 11 Jun. 2020 and titled "Methods and Systems for Multi-Objective Optimization and/or Wireless Power Delivery", each of which is herein incorporated in its entirety by this reference, such as described regarding S430 of U.S. patent application Ser. No. 16/539,288 and/or of U.S. patent application Ser. No. 16/899,473). For example, S436 can include, for each configuration to be optimized, determining a respective plurality of performant transmission configurations (e.g., configurations close to one or more Pareto fronts, such as a Pareto front for performance of the receivers in the receiver group associated with the configuration to be optimized).

However, S430 and/or S436 can additionally or alternatively include optimizing transmission configurations in any other suitable manner.

4.2.4 Determining a Transmission Plan.

Determining a transmission plan S440 preferably functions to determine how power will be transmitted to the receivers. S440 is preferably performed in response to performing S430, but can additionally or alternatively be performed at any other suitable time. S440 preferably includes: determining desired power delivery S441, selecting a set of transmission configurations S442, and/or determining durations for the transmission configurations S443, but can additionally or alternatively include any other suitable elements.

Determining desired power delivery S441 preferably includes: for each receiver, determining a metric associated with desired power delivery to that receiver. The metric is preferably the total energy to be delivered, such as the energy needed to charge a battery (e.g., battery of a client device associated with the receiver) to a threshold value. The metric can alternatively be a power delivery metric, such as an average or minimum power to be delivered (e.g., average or minimum value equal to or greater than the expected average power consumption by devices powered by the receiver). However, the metric can alternatively be any other metric determined based on information such as device energy state and/or consumption, or can be any other suitable metric. The metric (and/or information for determining the metric) is preferably received (e.g., by the transmitter) from the receiver (e.g., via wireless communications), but can additionally or alternatively be determined in any other suitable manner. S441 is preferably performed for each receiver (e.g., within communication range of the transmitter), but can additionally or alternatively be performed for any suitable set of receivers.

In embodiments in which the system includes one or more negative-feedback receivers, S441 can optionally include, for one or more negative-feedback receivers (preferably, for all such receivers), determining an associated metric (e.g., as described above). For example, the metrics associated with negative-feedback receivers can be maximum power (e.g., average power such as averaged over a thermal dissipation timeframe, instantaneous power, etc.) and/or total energy delivery values. However, S441 can additionally or alternatively include accounting for the negative-feedback receivers in any other suitable manner.

S441 can optionally include removing one or more receivers (e.g., receivers for which a sufficiently high power delivery is difficult or impossible to achieve) from consideration, such as by setting the associated metric to zero for such receivers. For example, for each receiver (or a subset thereof), if no known transmission configuration achieves an objective function value (for the objective function associated with the receiver under consideration) greater than a threshold value (e.g., predetermined value; value relative to the receiver's power consumption and/or state of charge; value relative to the other objective function values, such as the average objective function maximum, average objective function value over the transmission configurations determined in S430 (e.g., in S436) or a subset thereof such as the subset determined based on the objective function, lowest objective function maximum, lowest objective function value over the pluralities of transmission configurations determined in S430 (e.g., in S436) or a subset thereof such as the subset determined based on the objective function; etc.), the receiver can be removed from consideration. However, S441 can additionally or alternatively include determining the metrics in any other suitable manner.

Selecting a set of transmission configurations S442 preferably includes selecting from the transmission configurations determined in S430 (e.g., optimized configurations generated in S436, multi-beam configurations determined in S432 and/or selected in S434, etc.). In some examples in which multi-objective optimization is performed, this can include selecting from the pluralities of non-dominated transmission configurations determined in S430 (e.g., each plurality associated with a different receiver group). S442 preferably includes selecting a subset of these configurations. For example, S442 can include selecting a threshold number (e.g., 1, 2, 3, 4-9, 10-30, 30-100, etc.) of transmission configurations from each plurality. In a specific example, S442 includes selecting a single transmission configuration from each plurality.

Selecting a subset (e.g., optimal subset) of these configurations can include performing an optimization search (e.g., to determine the optimal subset), wherein the optimal subset is preferably the subset associated with the optimal transmission plan (e.g., the subset of configurations for which the optimal transmission plan specifies a non-zero charging time and/or duty cycle). Performing the search preferably includes assessing candidate subsets (e.g., evaluating an objective function based on the candidate subsets). To assess a candidate subset, power transmission durations for the candidate subset can be determined (e.g., as described below regarding S443), wherein a candidate subset metric can be determined based on these durations (e.g., sum of the durations). For example, the optimization goal of the search can be to minimize the total charging time (e.g., time needed to achieve the desired energy delivery to all of the receivers). The search can be performed (e.g., based on the candidate subset metrics) using one or more discrete optimization algorithms, such as a grid search (e.g., adaptive grid search), hill climbing algorithm, discrete evolutionary algorithm, and/or any other suitable algorithms. In embodiments in which the system includes one or more negative-feedback receivers, the search can optionally be constrained based on the negative-feedback receiver metrics (e.g., wherein the maximum threshold power and/or energy is not exceeded). However, the optimal subset can additionally or alternatively be determined in any other suitable manner (or any other suitable subset can be selected).

Alternatively, S442 can include selecting all transmission configurations determined in S430, such as all optimized configurations generated in S436 (e.g., not excluding any such configurations from consideration). For example, in embodiments in which S436 includes performing optimizations based on multi-variate objective functions, rather than performing multi-objective optimizations (e.g., resulting in a single optimized configuration for each receiver group, rather than a plurality), it may be preferable to select all the transmission configurations generated in S436.

S442 can optionally include selecting one or more transmission configurations that are each associated with (e.g., optimized for) a single receiver ('single-receiver configurations'). For example, S442 can include selecting a single-receiver configuration for each receiver (e.g., each receiver in proximity to the transmitter), in addition to selecting transmission configurations as described above (e.g., configurations generated in S436). Each single-receiver configuration is preferably a transmission configuration optimized (e.g., optimized such as described in U.S. patent application Ser. No. 16/715,266, filed 16 Dec. 2019 and titled "Method and System for Wireless Power Delivery", which is herein incorporated in its entirety by this reference) based only on performance of the single receiver with which it is associated (e.g., optimized during S410 and/or any other suitable time). However, the single-receiver configurations can additionally or alternatively include the configurations associated with beam-like patterns that are determined in S410, and/or can include any other suitable configurations. Including these single-receiver configurations can function to enable use of such configurations in addition to (and/or in place of) the multi-receiver configurations determined in S430, such as in case some or all multi-receiver configurations are significantly less performant than the single-receiver configurations that could be used in their place.

Determining durations for the transmission configurations S443 is preferably performed for a subset of transmission configurations (e.g., the optimal subset selected in S442, a candidate subset being considered during the search for the optimal subset performed in S442, etc.). S443 preferably includes solving a linear programming problem.

For this problem, the constraint is preferably to deliver a desired amount of energy to each receiver (e.g., based on the desired power delivery determined in S441). For example, the constraint for each receiver can be expressed as $$\sum_j t_j f_i(y_j) \geq E_i$$

wherein the each $y_j$ represents a transmission configuration of the subset being considered, $f_i(y_j)$ represents power delivered to receiver i under transmission configuration $y_j$, $E_i$ represents the minimum total energy to be delivered to receiver i, and $t_j$ represents the time duration for which transmission should be conducted under transmission configuration $y_j$ (the time duration solved for by performing S443); preferably wherein the sum is taken over all transmission configurations of the subset, but alternatively wherein the sum is taken over only the transmission configurations (of the subset) for which the associated set of receivers includes receiver i, and/or over any other suitable transmission configurations. In embodiments in which one or more receivers are associated with priority states (e.g., priority categories such as high, medium, or low charging priority; priority ranking; numeric priority score; etc.), the constraint can optionally be altered based on the priority state. For example, the constraint can be altered such that the resulting transmission plan will prioritize power delivery to the higher-priority receivers, even if the total transmission time to satisfy all receivers' metrics will be increased (e.g., wherein, as compared with an unaltered constraint, the transmission time required to satisfy the high-priority receivers is reduced but the transmission time required to satisfy the low-priority receivers is increased). In embodiments in which the system includes one or more negative-feedback receivers, the linear programming problem can additionally or alternatively be constrained based on the negative-feedback receiver metrics (e.g., wherein the maximum threshold power and/or energy is not exceeded).

The objective of the linear programming problem is preferably to minimize the total transmission time needed to satisfy the constraints (e.g., the sum of the individual durations, $t_{total} = \Sigma_j t_j$). The linear programming problem can be solved using one or more Simplex algorithms, criss-cross algorithms, interior point methods (e.g., path following methods, ellipsoid methods, Karmarkar's algorithm, Affine scaling methods, Mehrotra predictor-corrector method, etc.), column generation algorithms, and/or any other suitable linear programming approaches.

However, S443 can additionally or alternatively include determining the durations by optimizing a nonlinear function of the durations (or a subset thereof) and/or in any other suitable manner.

S440 preferably includes determining a transmission plan, wherein the plan is preferably indicative of (e.g., includes) the optimal subset (e.g., selected in S442) and, for each transmission configuration of the optimal subset, the associated transmission duration (e.g., determined in S443) and/or duty cycle (e.g., determined based on the transmission duration, such as equal to the transmission duration for the associated transmission configuration divided by the sum of all the transmission durations). However, S440 can additionally or alternatively include determining any other suitable transmission plan in any suitable manner.

4.3 Transmitting Power Based on the Transmission Plan.

Transmitting power based on the transmission plan S700 can function to wirelessly deliver power to the receiver. Power is preferably transmitted S700 in response to assessing transmission parameters S400 (e.g., in response to determining the transmission plan S440), but can additionally or alternatively be performed at any other suitable time. Power is preferably transmitted S700 throughout the receivers' residence time within range of the transmitter, but can additionally or alternatively be transmitted intermittently, according to a schedule, based on the receiver operation parameters (e.g., state of charge), and/or with any other suitable timing.

S700 preferably includes cycling through the transmission configurations indicated by the plan (e.g., the optimal subset of configurations), more preferably wherein such cycling is time-weighted as indicated by the plan (e.g., in proportion to the associated durations and/or duty cycles). For example, the configurations can be cycled through at a predetermined total cycle frequency, each duration can be divided (e.g., equally divided) into a predetermined number of time slices, and/or the configurations can be cycled through at any other suitable rate. Alternatively, the configurations can be cycled through without time-weighting (and/or any other suitable time-weighting), such as wherein a configuration is eliminated from the cycle once the desired duration has elapsed. However, S700 can additionally or alternatively include transmitting under any other suitable transmission configurations for any suitable periods of time.

The power is preferably transmitted as one or more pure-tone (or substantially pure-tone, such as defining a bandwidth less than a threshold bandwidth) signals (e.g., which can be beneficial in embodiments that employ one or more supergaining structures and/or other narrow bandwidth antennas), but can additionally or alternatively be transmitted in any other suitable form (e.g., in embodiments that employ wider-bandwidth antennas, in embodiments in which communication signals are transmitted along with the power, etc.). In a first specific example, the radiation has a GHz-scale frequency (e.g., 5-10 GHz, such as 5.8 GHz and/or greater than 5.8 GHz). In a second specific example, the radiation has a hundreds of MHz-scale frequency (e.g., 100-500 MHz, such as 433 MHz and/or less than 433 MHz; 700-1100 MHz, such as 806-821 MHz, 851-870 MHz, 896-902 MHz, 902-928 MHz, and/or 935-941 MHz; etc.). However, the power can additionally or alternatively be received in any other suitable form.

S400 (or one or more elements thereof) can optionally be repeated during power transmission S700 (e.g., wherein power transmission is temporarily halted during transmission parameter reassessment). Repeated performances of S400 preferably use the most recently determined transmission configurations as initial values, but can additionally or alternatively use any other suitable values (e.g., as done during the initial performance of S400, using other previously-determined values, etc.). S400 can be repeated in response to detecting a change (e.g., greater than an absolute or relative threshold) in delivered power, detecting movement (e.g., based on receiver and/or transmitter measurements, such as IMU measurements), detecting an additional receiver and/or transmitter in proximity to the system S100, determining a change in desired power delivery (e.g., based on updated battery charge information) to one or more receivers (e.g., repeating S440 in response to such a change), receiving a user input, can be repeated periodically (e.g., at a predetermined rate; at a dynamically-determined rate, such as determined based on an observed and/or expected temporal and/or spatial stability of the system and/or its performance, preferably wherein lower stability corresponds to a more rapid rate; etc.), sporadically, randomly, and/or can be repeated at any other suitable time. However, power can be transmitted S700 in any other suitable manner, and the method can additionally or alternatively include any other suitable elements performed in any other suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A system for wireless power transmission, the system comprising:
    a set of power receivers, each power receiver of the set configured to:
        receive power wirelessly;
        characterize the power received wirelessly to determine a set of reception characterizations; and
        send communications indicative of the reception characterizations; and
    a power transmitter configured to:
        transmit a set of test patterns toward the set of power receivers; and
        based on a multi-beam transmission configuration, transmit power to a plurality of power receivers of the set;
    wherein the system is configured to:
        receive reception information indicative of the reception characterizations;
        based on the reception information and the set of test patterns, determine the multi-beam transmission configuration; and
        provide, to the power transmitter, configuration information indicative of the multi-beam transmission configuration.

2. The system of claim 1, wherein the controller system determines the multi-beam transmission configuration based on a linear combination of test patterns of the set.

3. The system of claim 2, wherein:
    the set of test patterns comprises a plurality of beam-like patterns; and
    the linear combination of test patterns comprises a linear combination of beam-like patterns of the plurality.

4. The system of claim 3, wherein:
    the power transmitter is configured to transmit the set of test patterns such that, for each power receiver of the set, the power transmitter iteratively modifies a respective transmission direction during test pattern transmission;
    for each power receiver of a subset of the set of power receivers, the system is further configured to determine, based on the set of test patterns and the reception information, a respective optimized transmission direction associated with the power receiver; and the system is configured to determine the multi-beam transmission configuration based further on the subset of power receivers and the respective optimized transmission directions.

5. The system of claim 4, wherein the linear combination of beam-like patterns comprises, for each respective optimized transmission direction, a respective beam-like pattern directed substantially along the respective optimized transmission direction.

6. The system of claim 4, wherein, for each power receiver of the set, iteratively modifying the respective transmission direction comprises:
   at the power transmitter:
   transmitting a first test pattern associated with a first transmission direction; and
   after transmitting the first test pattern, transmitting a second test pattern associated with a second transmission direction;
   at a first power receiver of the set:
   receiving power wirelessly from the first test pattern and the second test pattern;
   characterizing the power received wirelessly from the first test pattern to determine a first reception characterization;
   characterizing the power received wirelessly from the second test pattern to determine a second reception characterization; and
   sending a first set of communications indicative of the first reception characterization and the second reception characterization;
   at the system:
   receiving first reception information indicative of the first reception characterization and the second reception characterization; and
   based on the first reception information, the first test pattern, and the second test pattern, determining a third test pattern; and
   providing, to the power transmitter, first configuration information indicative of the third test pattern; and
   at the power transmitter, based on the first configuration information, transmitting the third test pattern.

7. The system of claim 4, wherein, for each power receiver of the set, iteratively modifying the respective transmission direction comprises performing an optimum search over a respective power reception metric associated with the power receiver.

8. The system of claim 4, wherein the set of power receivers consists of the subset of power receivers.

9. The system of claim 3, wherein the multi-beam transmission configuration is configured to produce a multi-beam transmission pattern, wherein the multi-beam transmission pattern is substantially equal to the linear combination of beam-like patterns.

10. The system of claim 9, wherein the system is configured to determine the multi-beam transmission configuration using at least one of: a Fourier transform-based approach, a Woodward-Lawson method-based approach, an error optimization approach, or a superposition approach.

11. The system of claim 2, wherein the multi-beam transmission configuration is configured to produce a multi-beam transmission pattern, wherein the multi-beam transmission pattern is substantially equal to the linear combination of test patterns.

12. The system of claim 1, wherein the multi-beam transmission configuration is configured to produce a multi-beam transmission pattern, wherein the multi-beam transmission pattern is substantially equal to a linear combination of test patterns of the set.

13. The system of claim 1, wherein receiving the first reception information, determining the third test pattern, and providing the first configuration information is performed at the power transmitter.

14. The system of claim 1, wherein the system is configured to determine the multi-beam transmission configuration using at least one of: a Fourier transform-based approach, a Woodward-Lawson method-based approach, an error optimization approach, or a superposition approach.

15. The system of claim 1, wherein the system is configured to determine the multi-beam transmission configuration based on a set of power reception metrics, wherein each power reception metric of the set is substantially proportional to a power transmission efficiency to a power receiver associated with the power reception metric.

16. The system of claim 15, wherein the system is further configured to determine the set of power reception metrics based on the reception information and the set of test patterns.

17. The system of claim 1, wherein the system is further configured to:
   based on the multi-beam transmission configuration, perform an optimum search in a power transmitter configuration space defined by the multi-beam transmission configuration;
   based on the optimum search, determine an optimized transmission configuration; and
   at the power transmitter, transmit power based on the optimized transmission configuration.

18. The system of claim 17, wherein the optimum search is a local optimum search performed around the multi-beam transmission configuration.

19. The system of claim 1, wherein each power receiver of the set comprises a respective wireless communication module configured to send the communications.

20. The system of claim 1, further comprising a networking module configured to:
   receive the reception information indicative of the reception characterizations;
   based on the reception information and the set of test patterns, determine the multi-beam transmission configuration; and
   provide, to the power transmitter, the configuration information indicative of the multi-beam transmission configuration.

* * * * *